June 20, 1944.   V. R. KIMBALL   2,351,619
GYRO ERECTING MECHANISM
Filed July 16, 1942   2 Sheets-Sheet 1
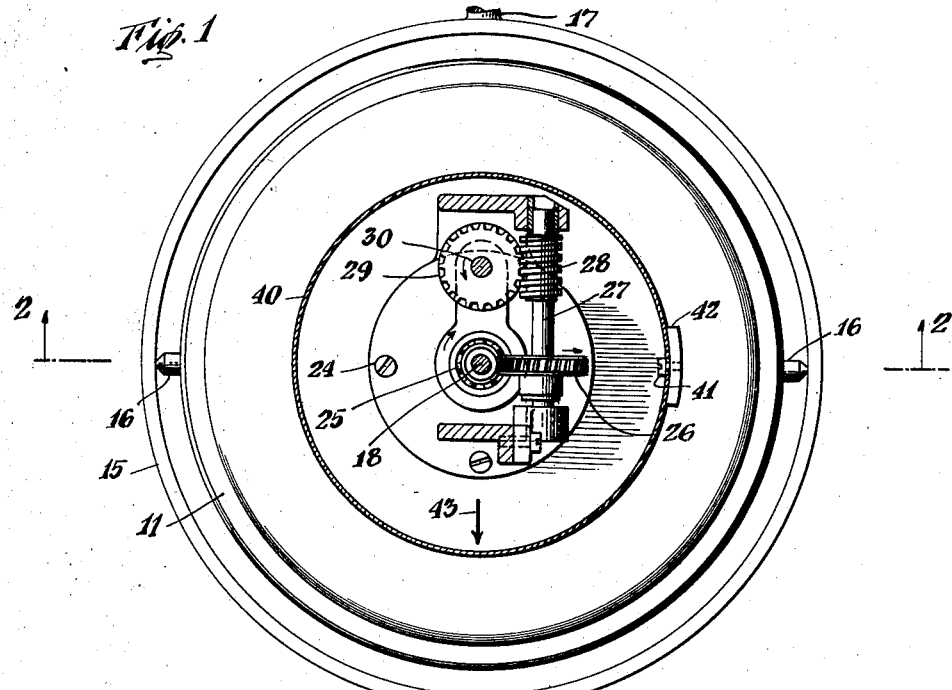
Fig. 1
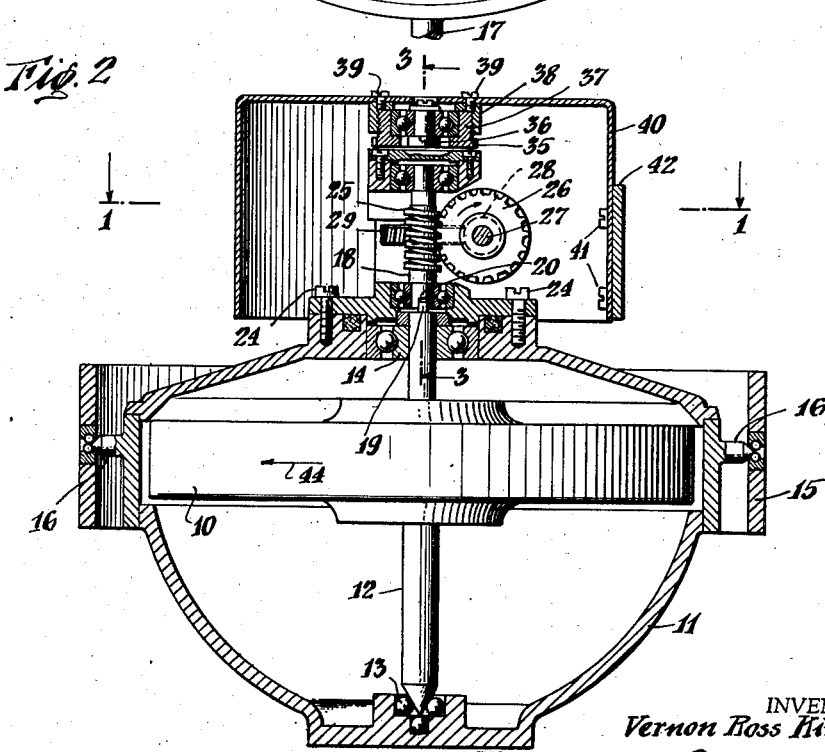
Fig. 2
INVENTOR.
Vernon Ross Kimball
BY
ATTORNEY June 20, 1944.  V. R. KIMBALL  2,351,619
GYRO ERECTING MECHANISM
Filed July 16, 1942   2 Sheets-Sheet 2
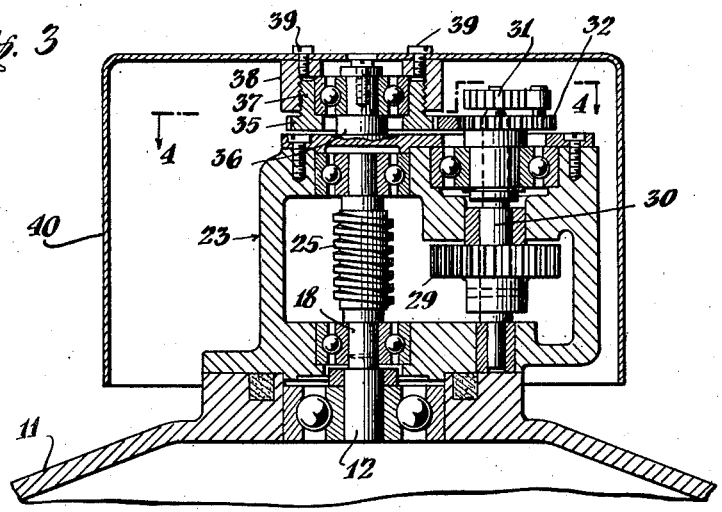
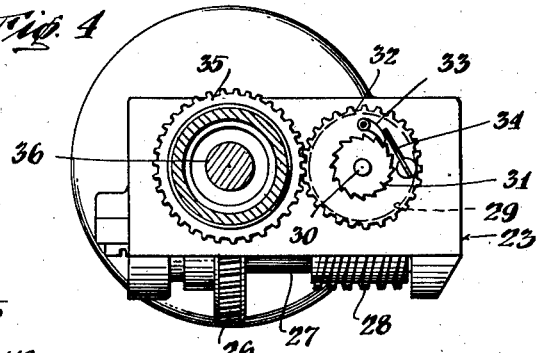
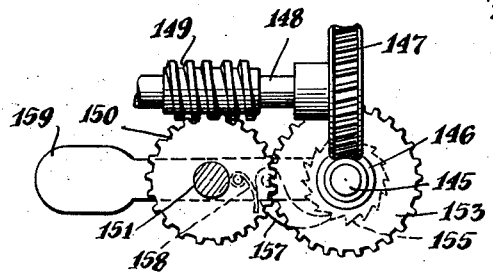
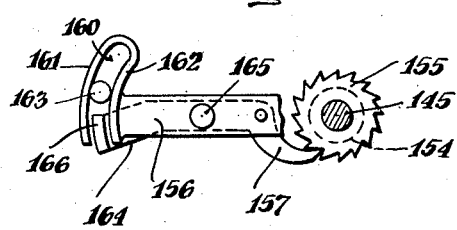
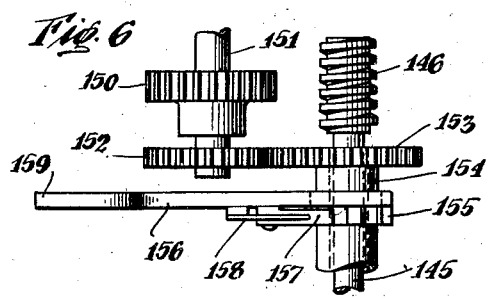
INVENTOR.
Vernon Ross Kimball
BY
ATTORNEY Patented June 20, 1944

2,351,619

UNITED STATES PATENT OFFICE 2,351,619

GYRO ERECTING MECHANISM

Vernon R. Kimball, Maywood, N. J., assignor to Bendix Aviation Corporation, Bendix, N. J., a corporation of Delaware Application July 16, 1942, Serial No. 451,174

14 Claims. (Cl. 74—5)

This invention relates to gyroscopic devices of the type adapted for indicating the true vertical so as to provide an artificial horizon on moving vehicles such, for example, as aircraft, and more particularly to self-erecting means for such devices for maintaining the gyro spin axis vertical.

Devices of this general nature are known in the art, as represented by the United States Patent to Robert Alkan, 2,159,118, issued May 23, 1939, and utilize slip-drive connections between the erecting mechanism and the rotor. Slip-drives of such nature provide a source of error because of variations in the coefficients of friction of the drive. In order to overcome those errors, complicated regulating or escapement mechanisms have been provided. Although such regulating or escapement mechanisms serve their purpose well enough, the present invention contemplates the provision of novel means with the use of which the need for regulating or escapement mechanisms is removed.

An object of the present invention, therefore, is to provide a gyro vertical or artificial horizon with novel erecting means for maintaining the gyro spin axis in its normally vertical position.

Another object of the invention is to provide a gyro vertical or artificial horizon with novel erecting means having an improved and positive speed reduction drive between the gyroscope and the erecting mechanism.

A further object of the invention is to provide a gyro vertical or artificial horizon with novel erecting means normally driven at a substantially reduced and constant speed from the gyroscope through a normally engaging pawl and ratchet wheel arrangement, the pawl of which is mounted to override the ratchet wheel upon gyro tilt to vary the speed of the erecting mechanism whereby erecting forces are developed on the gyroscope.

Another object of the invention is to provide a gyro vertical or artificial horizon having novel means for rapidly damping the oscillations or precession of the gyroscope about its position of equilibrium.

A further object of the invention is to provide a novel gyro vertical or artificial horizon in which disturbances thereof due to acceleration forces or bearing friction are substantially reduced thereby improving the character of the gyroscope as a navigational instrument.

The above and other objects and advantages of the invention will appear more fully hereinafter from' a consideration of the detailed description which follows, taken together with the accompanying drawings wherein several embodiments of the invention are illustrated. It is to be expressly understood, however, that the drawings are for the purpose of illustration and description only and are not designed as a definition of the limits of the invention.

In the drawings, wherein like reference characters refer to like parts in both views, Figure 1 is a top plan view of a gyro vertical embodying the present invention, partially in section taken substantially along line 1—1 of Figure 2;

Figure 2 is a vertical section taken substantially along line 2—2 of Figure 1;

Figure 3 is a vertical section taken substantially along line 3—3 of Figure 2;

Figure 4 is a section taken substantially along line 4—4 of Figure 3;

Figure 5 is a fragmentary top plan view of a modified form of the invention;

Figure 6 is a side elevation view of the form of the invention of Figure 5; and, Figure 7 is a fragmentary view of still another form of the present invention.

The improved navigational device embodying the present invention comprises a gyroscope having a gyro rotor mounted in a gimbal suspension for spinning about a normally vertical axis and for angular movement about two mutually perpendicular horizontal axes at right angles to the spin axis, the rotor being enclosed and journalled in a casing carried by the gimbal suspension. The gyro rotor may be driven electrically or in any other suitable and desirable manner known in the art.

The mechanism for stabilizing the gyroscope and, thus, maintaining its spin axis vertical in order that the gyroscope may serve as a gyro vertical or artificial horizon, comprises a weighted mass arranged to travel in a circular path about the rotor spin axis. For this latter purpose there are provided supporting means mounted for rotation with the gyro rotor to guide the mass about the gyro spin axis.

Novel driving means comprising a speed reduction gear mechanism from the gyro rotor shaft is provided for driving the supporting means and the mass about its circular path at a speed substantially smaller than the speed of rotation of the gyro rotor. Included in the drive are cooperating members which engage with each other, when the rotor spin axis remains in its normally vertical position, to maintain the speed of rotation of the supporting means substantially constant and less than the speed of rotation of the rotor. For example, the supporting means may rotate at a speed of only a few dozens of revolutions per minute, while the gyro rotor may have a speed of several thousand revolutions per minute.

As soon as the gyro spin axis departs from its normally vertical position, due to bearing friction, accelerations or other disturbing forces, the weighted mass cooperates with the drive to cause disengagement of the cooperating members to produce a variable driving action on the supporting means whereby erecting forces are developed which return the gyro spin axis back to its normally vertical position. The cooperating members are then brought back into engagement and the supporting means is returned to its constant speed of rotation.

Referring now to Figures 1 and 2 of the drawings for a more detailed description, the present invention is shown as comprising a gyroscope including a rotor 10 mounted within a casing or housing 11 for spinning about a normally vertical axis. Rotor 10 is provided with a shaft or trunnion 12 which is secured to the rotor or formed integrally therewith, one end of the shaft being journalled in a bearing 13 at the bottom of casing 11 while the upper end of the shaft is journalled in a similar bearing 14 in the upper part of the casing.

Rotor casing 11 is mounted within a gimbal suspension comprising a gimbal ring 15 in which the casing is pivoted for angular movement about a horizontal axis formed by trunnions 16, 16, the gimbal ring, in turn, being pivoted for angular movement about a second horizontal axis, perpendicular to the first axis, formed by trunnions 17, 17 which are journalled in a fixed support (not shown).

Coming now to the novel speed reduction gear drive between the gyro rotor and the erecting mechanism, a spindle shaft 18 is driven by shaft 12 and for this purpose shaft 12 is provided with a projection 19 cooperating with a groove or transverse recess 20 formed in the spindle shaft. The free ends of the spindle shaft are journalled within suitable bearings provided within a speed reduction housing 23 (Fig. 3) which is fastened by means such as bolts 24 to the top of rotor casing 11.

A worm gear 25, carried by or formed integrally with spindle shaft 18, meshes with and drives a a gear 26 which is splined to a transverse shaft 27 having its free ends journalled within housing 23. A second worm gear 28 is carried by transverse shaft 27 and meshes with and drives a second gear 29 which is mounted on a shaft 30, journalled within housing 23, and arranged parallel with spindle shaft 18 and the rotor spin axis.

A ratchet wheel 31 (Figures 3 and 4) is fastened for rotation with shaft 30 while sleeved about shaft 30 for relative movement thereto and intermediate the ratchet wheel and second gear 29 is a further gear 32 carrying a pivotally mounted pawl 33 thereon which is normally yieldably urged into engagement with the ratchet wheel by virtue of a spring element 34 anchored to gear 32 (Figure 4).

The teeth on ratchet wheel 31 are so arranged that pawl 33 engages therewith and is driven thereby to drive its gear 32. Should, however, for any reason, the speed of rotation of gear 32 exceed that of the ratchet wheel, pawl 33 will override the ratchet wheel and the rotation of gear 32 will be independent of wheel 31.

Normally, therefore, the clutching surfaces defined by ratchet wheel 31 and pawl 33 are in engagement so that gear 32 is driven at the speed of ratchet wheel 31 which speed is substantially constant because of the engagement of the pawl and ratchet wheel and substantially smaller than the speed of rotor rotation because of the speed reduction drive defined by worm 25, gear 26, worm 28 and gear 29.

Gear 32 meshes with a gear 35 secured to a stub shaft 36 which is coaxial with spindle shaft 18 and the rotor spin axis. Gear 35, furthermore, is provided with an annular extension 37 which screw-threadedly engages with an annular ring 38 fastened by means of bolts 39 to a cylindrical housing or drum 40. By virtue of the foregoing arrangement and when the gyro spin axis is in its normally vertical position, drum 40 is driven through the speed reduction gear drive and the pawl and ratchet wheel arrangement at a substantially constant speed and at a speed substantially less than the speed of rotor rotation.

In order to render the system operative and effective to produce erecting forces for returning the gyro spin axis to vertical, in the event the spin axis departs from vertical for any reason, the outer periphery of drum 40 has secured thereto by way of fastening means 41 a weighted mass 42.

In operation, when gyro rotor 10 is rotated with its shaft 12, the worm 25, which is secured for rotation with spindle shaft 18, drives drum 40 and mass 42 through gear 26, worm 28, gear 29, ratchet wheel 31, pawl 33, gear 32 and gear 35. Drum 40, together with mass 42, is thus rotated about rotor shaft 12 at a substantially constant and smaller speed than the speed of rotor rotation. The speed reduction gearing is so designed that the drum 40 rotates at a speed of a few dozens of revolutions per minute even though the gyro rotor 10 and worm 25 rotate at several thousand revolutions per minute.

Assuming now that an acceleration force acts in the direction of a central arrow 43, shown in Figure 1, and the plane of the paper, causing a departure of the rotor spin axis from the normally vertical position, and the gyro rotor together with drum 40 are rotating clockwise as indicated by arrow 44 (Figure 2), the action of the acceleration force exerted on mass 42 will tend to increase the speed of drum rotation at the instant drum 40 and mass 42 are in the position shown in Figure 1. The increased speed of rotation of drum 40 is transmitted through gears 35 and 32 to pawl 33 to cause the pawl, against the action of spring 34, to override and exceed the speed of the ratchet wheel. The increased speed of drum rotation continues until mass 42 reaches a position diametrically opposite to that shown in Figure 1 at which point mass 42 expands its increased speed and stops momentarily thereby developing moments in a direction toward the plane of the paper and about trunnions 17, 17 causing the rotor spin axis to precess about trunnions 16, 16 back to its normally vertical position.

As soon as the gyro spin axis re-establishes its normally vertical position, pawl 33 engages with ratchet wheel 31 and drum 40 is again rotated at a constant speed from the reduction gear drive and the ratchet wheel.

Because of the particular and novel speed reduction gear drive utilized, the speed of rotation of drum 40 and mass 42 is substantially constant while the gyro rotor spin axis is in its normally vertical position and the only variation in the speed of drum rotation is that caused by accelerations acting on mass 42 and that due to deviation of the spin axis from the true vertical resulting from bearing friction. For this reason, even a small acceleration is sufficient to make the time during which mass 42 travels for one half of a revolution with drum 40 to materially differ from the time required for it to travel the other half of the revolution. Such a variation manifests itself by a tendency of the gyro to erect its spin axis in the direction of the acceleration and by a direct precessional movement and not by a spiral precessional movement.

The foregoing operation of the erecting mechanism has been described only in connection with acceleration forces acting to disturb the rotor spin axis. However, tilting of the rotor spin axis due to bearing friction or causes other than acceleration forces results in the same operation of the erecting mechanism with the exception that in place of acceleration forces, a gravitational pull is exerted upon mass 42 to speed up motion of drum 40 for one half of a revolution, depending upon the direction of tilt, and to slow up the drum and the mass during their upward movement. At the moment that upward movement begins, the momentary stopping of drum 40 and mass 42, due to gravitational pull which is in the opposite direction at this point, results to create moments about either trunnions 16 or 17, again depending upon the direction of tilt to cause the rotor to precess into its normally vertical position.

If desired, drum 40 together with mass 42 fastened thereto may be replaced by means of an arm member mounted for rotation about the rotor spin axis and having a weight or mass formed integrally therewith at its free end. Such modification is shown in Figures 5 and 6 wherein a spindle shaft 145 is driven from the rotor shaft in the same manner that spindle shaft 18 is driven from rotor shaft 12.

The speed reduction gear drive between the rotor shaft and the erecting mechanism, as before, comprises a worm gear 146 secured to or formed integrally with spindle shaft 145 which meshes with a gear 147 fastened to a transverse shaft 148. The free end of the latter shaft carries a second worm gear 149 which meshes with and drives a second gear 150 mounted on a shaft 151, the latter shaft being parallel to spindle shaft 145 and the rotor spin axis. Shaft 151 also mounts a gear 152 which meshes with and drives a further gear 153 which is securely fastened to a hub 154 loosely sleeved about the spindle shaft. Secured to and driven with the hub from the rotor by the speed reduction gearing is a ratchet wheel 155, similar to ratchet wheel 31 of Figures 1 to 4.

Sleeved about hub 154 for relative rotation thereon and slightly above the ratchet wheel is an arm member 156 which has pivotally mounted thereon a pawl 157 normally yieldably urged into engagement with the driving face of a ratchet tooth by means of a spring element 158 anchored on arm 156. Formed integrally with arm 156 and at its free end is a weight or mass 159 for a purpose to presently appear.

The operation of the arrangement of Figures 5 and 6 is substantially the same as that described above in connection with the novel arrangement of Figures 1 to 4. Considered briefly, ratchet wheel 155 is rotated about an axis coaxial with the spin axis at a substantially constant speed and one less than the speed of the rotor because of the novel speed reduction gear drive therebetween. When the spin axis is in its normally true vertical position, pawl 157 engages the driving face of a ratchet tooth so that arm member 156 and its mass 159 are, likewise, rotated about an axis coaxial with the spin axis at the speed of the ratchet wheel.

As soon, however, as the spin axis is caused to deviate from its true vertical in the manner previously described, in connection with the arrangement of Figures 1 to 4, acceleration or gravitation forces act upon weight 159 to speed up rotation over one half of a revolution of arm 156. This action causes pawl 157 to override the ratchet wheel so that motion of the arm becomes independent of the reduction gear drive. The arm and weight 159 are caused to stop momentarily just prior to the beginning of the second half of the revolution of arm 156 and thus moments are developed about the gyro trunnions causing the spin axis to precess back to its normally true vertical position. As this occurs pawl 157 will immediately rest against the driving face of a ratchet tooth and the weight and arm will again rotate at a uniform speed about the rotor spin axis.

A still further form of the invention is illustrated in Figure 7 wherein the arm member 156, of Figures 5 and 6, is provided at its free end with a chamber 160 having curved walls 161 and 162 defining a ball race for a weighted mass in the form of a ball 163 which is arranged for rolling motion within chamber 160. Pawl 157, in this case, is provided with an extended link 164, which is pivotally mounted on arm 156 at 165 and at its free end is provided with a projection 166 which closes the open end of chamber 160.

The operation of this form of the invention is substantially the same as that considered in connection with the arrangement of Figures 5 and 6. Ratchet wheel 155 is driven with hub 154 from the rotor shaft through the speed reduction gear drive at a substantially constant speed and one substantially less than the speed of rotor rotation. Arm 156 is driven about the spin axis at the speed of the ratchet wheel by virtue of the engagement of pawl 157 with a tooth of the wheel. When the rotor spin axis is in its true vertical position, arm 156 is rotated clockwise at a uniform speed and the ball rests against projection 166 to pivot the link to hold the pawl in engagement with the wheel. When arm 156 is in a position diametrically opposite to that shown in Figure 7, and the spin axis deviates due to acceleration forces or bearing friction, ball 163 will leave projection 166 and roll toward the junction of the chamber walls to speed up rotation of arm 156. At the same time, projection 166, having mass, moves in the direction of ball 163 and thus causes link 164 to pivot about point 165 and cause the pawl to disengage and override the ratchet wheel. Thus, arm 156 speeds up in rotation and independently of the speed reduction gear drive. When the arm reaches the position shown in Figure 7, the ball rolls backward to engage projection 166 to momentarily stop rotation of the arm whereupon moments are developed about the gyro trunnions to precess the rotor spin axis to its normally true vertical position. At this point link 164 is pivoted about point 165 and urges pawl 157 into engagement with the ratchet wheel whereby arm 156 assumes a uniform speed of rotation.

From the foregoing, it will be apparent to those skilled in the art that a novel gyro vertical has been provided having novel erecting means and driving means therefor for maintaining the gyro spin axis in a true vertical position at all times without the use of pendulum controlled reaction air jets. By reason of the improved and novel combination of elements the erecting system is not disturbed when the artificial horizon or gyro vertical is used on aircraft during violent maneuvers but continues to perform its function properly and efficiently at all times.

Although several embodiments of the invention have been illustrated and described, various changes and modifications in the form and relative arrangement of the parts, which will now appear to those skilled in the art, may be made without departing from the scope of the invention. Reference is therefore to be had to the appended claims for a definition of the limits of the invention.

I claim:

1. In a gyro vertical, the combination of a gyroscope comprising a rotor mounted for spinning about a normally vertical axis, a casing mounting said rotor for angular movement about two mutually perpendicular horizontal axes at right angles to the spin axis, a member mounted for rotation about the rotor spin axis, a speed reduction mechanism connecting said rotor to said member for rotating said member at a speed substantially less than the speed of rotation of said rotor, said mechanism including a ratchet wheel and a pawl normally engaging said wheel for maintaining the speed of rotation of said member substantially constant while the rotor spin axis is in its normally vertical position, and a weight guided by said member for disengaging said pawl from said wheel upon deviation of the spin axis to vary the speed of rotation of said member whereby erecting forces are developed on the gyroscope to return the rotor spin axis to its normally vertical position.

2. In a gyro vertical, the combination of a gyroscope comprising gimbals and a gyro rotor mounted in said gimbals for spinning about a normally vertical axis and for angular movement about two mutually perpendicular horizontal axes at right angles to said spin axis, a member mounted for rotation about an axis coaxial with said spin axis, a rotatably mounted ratchet wheel, a speed reduction drive connecting said wheel with said rotor for rotating said wheel at a speed substantially less than the speed of said rotor, a pawl normally engaging said wheel for rotating said member in accordance with the rotation of said wheel and maintaining the speed of rotation of said member substantially constant while the rotor spin axis is in its normally vertical position, and a weight guided by said member about a path concentric with said spin axis for disengaging said pawl from said wheel upon deviation of the spin axis to vary the speed of rotation of said member whereby erecting forces are developed on the gyroscope to return the rotor spin axis to its normally vertical position.

3. In a gyro vertical, the combination of a gyroscope comprising gimbals and a gyro rotor mounted in said gimbals for spinning about a normally vertical axis and for angular movement about two mutually perpendicular horizontal axes at right angles to said spin axis, a member mounted for rotation about an axis coaxial with said spin axis, a speed reduction gear drive from said rotor to said member for rotating said member at a speed substantially less than the speed of rotation of said rotor, said drive including a ratchet wheel and a pivotally mounted pawl adapted for overriding said wheel but normally engaging said wheel for maintaining the speed of rotation of said member substantially constant while the rotor spin axis is in its normally vertical position, and a weight movable with said member for actuating said pawl to override said wheel upon deviation of the spin axis to vary the speed of rotation of said member whereby erecting forces are developed on the gyroscope to return the rotor spin axis to its normally vertical position.

4. In a gyro vertical, the combination of a gyroscope comprising a rotor mounted for spinning about a normally vertical axis, a casing mounting said rotor for angular movement about two mutually perpendicular horizontal axes at right angles to the spin axis, an arm mounted for rotation about the rotor spin axis, a speed reduction mechanism drivably connecting said arm with said rotor whereby said arm is rotated at a speed substantially less than the speed of said rotor, regulating means comprising a ratchet wheel driven by said mechanism and a pawl pivotally supported by said arm engageable with said wheel for maintaining the speed of rotation of said arm substantially constant while the rotor spin axis is in its normally vertical position, said pawl being adapted to disengage said wheel to vary the speed of rotation of said arm when the rotor spin axis deviates from said vertical position, and a weight movable with said arm for actuating said regulating means upon deviation of the spin axis to vary the speed of rotation of said arm whereby erecting forces are developed on the gyroscope to return said rotor spin axis to its normally vertical position.

5. In a gyro vertical, the combination of a gyroscope comprising a rotor mounted for spinning about a normally vertical axis, a casing mounting said rotor for angular movement about two mutually perpendicular horizontal axes at right angles to the spin axis, an arm mounted for rotation about an axis coaxial with said rotor spin axis, a pawl pivotally mounted on said arm, a ratchet wheel engageable by said pawl, a speed reduction gearing between said rotor and said ratchet wheel for driving said wheel at a speed substantially less than the speed of said rotor, said pawl being normally resiliently urged to engage said wheel whereby said arm is rotated at a substantially constant speed while the spin axis of said rotor is in its normally vertical position, and a mass guided by said arm for actuating said pawl to disengage said wheel upon deviation of the spin axis to vary the speed of rotation of said arm whereby erecting forces are developed on the gyroscope to return the rotor spin axis to its normally vertical position.

6. In a gyro vertical, the combination of a gyroscope comprising a rotor mounted for spinning about a normally vertical axis, a casing mounting said rotor for angular movement about two mutually perpendicular horizontal axes at right angles to the spin axis, a drum mounted for rotation coaxially with said spin axis, a rotatable ratchet wheel, a speed reduction gearing connecting said rotor with said wheel for rotating said wheel at a speed substantially less than the speed of said rotor, a pawl normally engaging said wheel for transmitting motion to said drum and maintaining the speed of drum rotation substantially constant while the spin axis is in its normally vertical position, and a weight secured to said drum for disengaging said pawl from said wheel upon a deviation of the spin axis to vary the speed of rotation of said drum independently of said drive whereby erecting forces are developed on the gyroscope to return the rotor spin axis to its normally vertical position.

7. In a gyro vertical, the combination of a gyroscope comprising a rotor mounted for spinning about a normally vertical axis, a casing mounting said rotor for angular movement about two mutually perpendicular horizontal axes at right angles to the spin axis, a member mounted for rotation about the rotor spin axis, a rotatably mounted toothed wheel, a speed reduction gear drive from said rotor to said wheel for rotating said wheel at a speed substantially less than the speed of rotation of said rotor, means connecting said member for rotation by said wheel and for maintaining the speed of rotation of said member substantially constant while the spin axis is in its normally vertical position, said means comprising a pivoted element normally engaging said wheel, and a weight associated with said member for disengaging said element from said wheel upon a deviation of the spin axis to vary the speed of rotation of said member independently of said drive whereby erecting forces are developed on the gyroscope to return the rotor spin axis to its normally vertical position.

8. In a gyro vertical, the combination of a gyroscope comprising a rotor mounted for spinning about a normally vertical axis, a casing mounting said rotor for angular movement about two mutually perpendicular horizontal axes at right angles to the spin axis, a drum mounted for rotation about said spin axis, a rotatably mounted toothed element, a speed reduction gear drive from said rotor to said element for rotating said element at a speed substantially less than the the speed of said rotor, a driving connection between said drum and said element comprising a pivoted member normally engaging said element for maintaining the speed of rotation of said drum substantially constant while the spin axis is in its normally vertical position, and a weight supported by said drum for disengaging said member from said element upon a deviation of the spin axis to vary the speed of rotation of said drum independently of said drive whereby erecting forces are developed on the gyroscope to return the rotor spin axis to its normally vertical position.

9. In a gyro vertical, the combination of a gyroscope comprising gimbals and a gyro rotor mounted in said gimbals for spinning about a normally vertical axis and for angular movement about two mutually perpendicular horizontal axes at right angles to said spin axis, an arm mounted for rotation about an axis coaxial with said rotor spin axis, a pawl pivotally mounted on said arm, a ratchet wheel engageable by said pawl, a speed reduction drive between said rotor and said ratchet wheel for driving said wheel at a speed substantially less than the speed of said rotor, said pawl being normally resiliently urged to engage said wheel whereby said arm is rotated at a substantially constant speed while the spin axis of said rotor is in its normally vertical position, and a weight formed integrally with said arm for actuating said pawl to disengage said wheel upon deviation of the spin axis to vary the speed of rotation of said arm whereby erecting forces are developed on the gyroscope to return the rotor spin axis to its normally vertical position.

10. In a gyro vertical, the combination of a gyroscope comprising gimbals and a gyro rotor mounted in said gimbals for spinning about a normally vertical axis and for angular movement about two mutually perpendicular axes at right angles to said spin axis, an arm mounted for rotation about an axis coaxial with said rotor spin axis, a pawl mounted for pivotal movement on said arm, a ratchet wheel engageable by said pawl, a speed reduction drive between said rotor and said ratchet wheel for driving said wheel at a speed substantially less than the speed of said rotor, said pawl being normally urged to engage said wheel whereby said arm is rotated at a substantially constant speed while the spin axis of said rotor is in its normally vertical position, a confining chamber formed by a portion of said arm, and a weight mounted for limited movement within said confining chamber for actuating said pawl to disengage said wheel upon deviation of the spin axis to vary the speed of rotation of said arm whereby erecting forces are developed on the gyroscope to return the rotor spin axis to its normally vertical position.

11. In a gyro vertical, the combination of a gyroscope comprising gimbals and a gyro rotor mounted in said gimbals for spinning about a normally vertical axis and for angular movement about two mutually perpendicular axes at right angles to said spin axis, an arm mounted for rotation about an axis coaxial with said rotor spin axis, a pawl mounted for pivotal movement on said arm, a ratchet wheel engageable by said pawl, a speed reduction drive between said rotor and said ratchet wheel for driving said wheel at a speed substantially less than the speed of said rotor, said pawl being normally urged to engage said wheel whereby said arm is rotated at a substantially constant speed while the spin axis of said rotor is in its normally vertical position, a confining chamber formed by a portion of said arm and an extension of said pawl, and a ball mounted for limited rolling movement within said confining chamber for actuating said pawl to disengage said wheel upon deviation of the spin axis to vary the speed of rotation of said arm whereby erecting forces are developed on the gyroscope to return the rotor spin axis to its normally vertical position.

12. The combination with a gyro vertical having an erecting mechanism for maintaining the rotor spin axis in a normally vertical position and comprising a member rotatable at a normally constant speed substantially less than the speed of rotor rotation, of a driving connection from said rotor comprising a speed reduction gearing, a ratchet wheel rotatably driven through said connection, and a pawl normally engaging said wheel for rotating said member in accordance with the rotation of said wheel.

13. The combination with a gyro vertical having an erecting mechanism for maintaining the rotor spin axis in a normally vertical position and comprising a member rotatable at a normally constant speed substantially less than the speed of rotor rotation when the spin axis is vertical but adapted to rotate at a variable speed when the spin axis deviates from the vertical, of a driving connection from said rotor comprising a speed reduction mechanism, a ratchet wheel rotatably driven through said connection, and a pawl normally engaging said wheel for rotating said member in accordance with the rotation of said wheel and adapted for overriding said wheel when the speed of said member departs from its normally constant speed.

14. The combination with a gyro vertical having an erecting mechanism for maintaining the rotor spin axis in a normally vertical position and comprising a member rotatable about the rotor spin axis at a normally constant speed substantially less than the speed of rotor rotation when the spin axis is vertical but adapted to rotate at a variable speed when the spin axis deviates from the vertical, of a driving connection from said rotor comprising a speed reduction gearing, a ratchet wheel rotatably driven through said connection, and a pivotally mounted pawl normally yieldably urged into engagement with said wheel for rotating said member in accordance with the rotation of said wheel and adapted for overriding said wheel when the speed of said member departs from its normally constant speed.

VERNON R. KIMBALL.